June 28, 1966 R. J. COLAVECCHIO 3,258,567
THERMOSTAT AND RESET THEREFOR
Filed May 29, 1964 2 Sheets-Sheet 1

INVENTOR,
ROBERT J. COLAVECCHIO,
BY Salter & Michaelson,
ATT'YS.

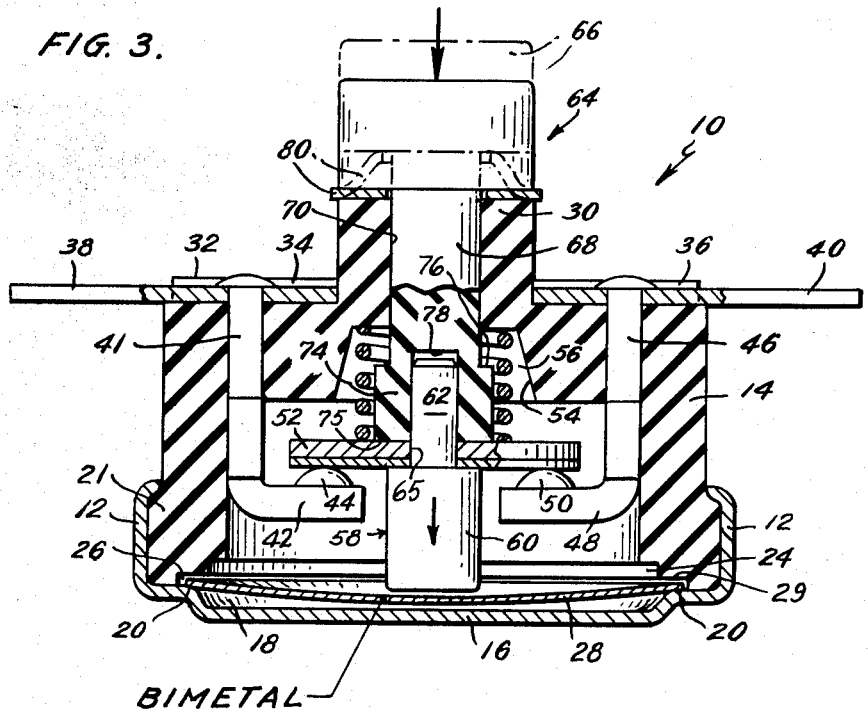

United States Patent Office 3,258,567
Patented June 28, 1966

3,258,567
THERMOSTAT AND RESET THEREFOR
Robert J. Colavecchio, Johnston, R.I., assignor to Elmwood Sensors, Inc., Cranston, R.I., a corporation of Rhode Island
Filed May 29, 1964, Ser. No. 371,236
4 Claims. (Cl. 200—138)

The present invention relates to a temperature responsive device and a reset therefor. More particularly, the present invention relates to a thermostat device that is adapted to be utilized in a small electrical appliance and that is provided with a manual reset for reestablishing electrical communication therein after the thermostat switch has been tripped in response to an increase in the temperature of the atmosphere surrounding the thermostat beyond a predetermined value.

The temperature responsive thermostat embodied in the present invention is operative at a predetermined temperature to disconnect or open the circuit in the appliance in which the thermostat is located. Since the thermostat is adapted to be reset by a manual control only, it is essential that the temperature responsive element within the thermostat be protected during the resetting operation. In the present invention, a push-button reset member is provided that is adapted to reset a bimetallic disc to its normal or closed position after the disc has been flexed in response to a predetermined increase in the temperature of the surrounding atmosphere. Since the temperature responsive disc is calibrated to operate within a predetermined temperature range, it is necessary that the disc be protected during the resetting operation in order that the calibration thereof be maintained. Thus, the present invention has particular application in the protection of the temperature responsive disc during the resetting operation by the push-button reset member. Protection of the temperature responsive disc during the resetting operation is provided for by utilizing a contact disc that bridges the space between spaced contact elements that are fixed within the thermostat unit. The contact disc is located in spaced relation with respect to the temperature responsive disc, and the contact elements are positioned between the two discs. By providing a pin that is adapted to interengage the temperature responsive disc and the contact disc, movement of the temperature responsive disc will result in movement of the contact disc, thereby removing the contact disc from engagement with the contact elements to break the circuit therebetween. Upon resetting of the device, the contact disc is moved toward the temperature responsive disc, thereby moving the interengaging member therewith. The temperature responsive disc is thus returned to the original position thereof, but since the contact disc is forced into engagement with the contact elements that are located in fixed position between the discs, further movement of the contact disc is prevented. The contact elements thus limit movement of the contact disc during the reset operation and thereby prevent undue pressure from being exerted on the temperature responsive disc by the reset member during the reset operation.

It is therefore an object of the present invention to provide a temperature responsive device and a manual reset therefor that are simple in construction and easy to operate.

Another object of the invention is to provide a thermostat which includes a thermostat element and a manual push-button reset member, a safety feature being incorporated in the thermostat for preventing undue pressure from being exerted on the thermostat element during the reset operation.

Still another object is to provide a temperature responsive disc for use as the actuating element in a thermostat where the disc is formed of a bimetallic material and is adapted to be flexed upon an increase in the temperature of the surrounding atmosphere beyond a predetermined value.

Still another object is to provide a thermostat having a bimetallic temperature responsive disc located therein and that further includes a manual push-button reset member, the calibration of the bimetallic disc being maintained by the arrangement of the elements, wherein undue pressure is prevented from being exerted on the disc during the resetting operation thereof.

Still another object is to provide a safety device for use in a thermostat, wherein a temperature responsive disc is protected from undue pressure being exerted thereon during the resetting of the thermostat.

Other objects, features and advantages of the invention will become apparent as the description thereof proceeds when considered in connection with the accompanying drawings.

In the drawings which illustrate the best mode presently contemplated for carrying out the present invention:

FIG. 3 is a sectional view of the temperature responsive device showing the position of the component parts thereof during the resetting operation.

Figure 1:
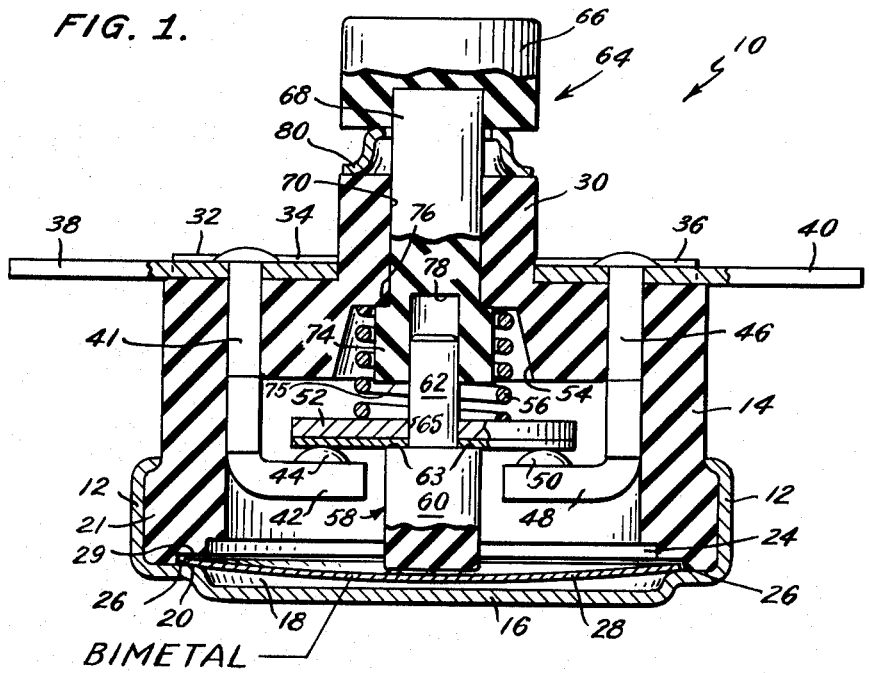
FIG. 1 is a vertical sectional view of the temperature responsive device and reset therefor embodied in the present invention.
Figure 2:
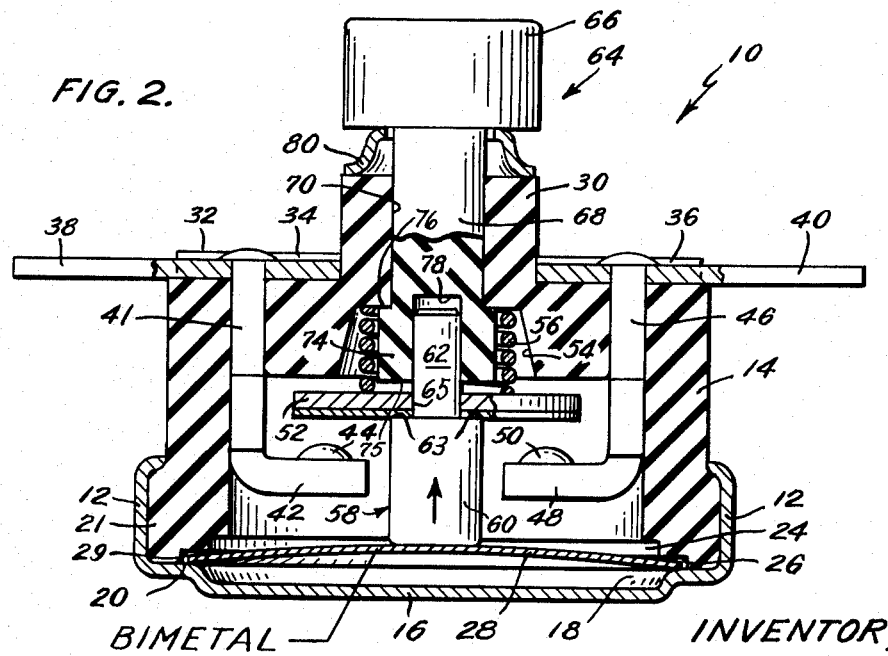
FIG. 2 is a sectional view similar to FIG. 1 showing the open position of the component parts of the thermostat embodied herein.

Referring now to the drawings and particularly to FIG. 1, the temperature responsive device or thermostat embodied herein is generally indicated at 10 and is adapted for use in a small electrical appliance such as a coffee percolator or the like. The thermostat 10 includes a cup shaped shell member 12 that defines a base. Secured in the base member 12 is a body portion 14 that is formed of an insulating material, the base member 12 including a central raised portion 16 that defines a central recess 18 and an annular shoulder 20. The body portion 14 includes an external annular flange portion 21 which cooperates with the side walls of the base member to securely mount the body portion 14 within the base member 12. Formed in the body portion 14 is a central chamber 22 that communicates with inner stepped, annular recesses 24 and 26. Located in the base member 12 and disposed on the shoulder 20 within the recess 26 is a temperature responsive actuating disc 28 that is formed of a bimetallic material. The actuating disc 28 is adapted to operate in response to a predetermined temperature and is permitted to flex from an inner bowed, closed position to an outer bowed, open position, the peripheral portion of the actuating disc being restrained from movement by a shoulder 29 located in the body portion 14 and that defines the recess 26. Thus the central portion of the actuating disc 28 is adapted to flex outwardly in response to an increase in the temperature of the atmosphere surrounding the thermostat 10 and will snap in an upwardly direction, as seen in FIG. 2, when a predetermined temperature is reached. As will be described, the flexing movement of the temperature responsive actuating disc 28 will produce a corresponding movement of the components operatively connected thereto to disconnect or open the circuit in the thermostat.

Integrally joined to the outer end of the body portion 14 is a reduced neck section 30 that cooperates with the body portion to define an annular shoulder 32. Located in suitable grooves 34 and 36 in the annular shoulder 32 are electrical terminals 38 and 40, respectively, that are interconnected in the circuit of the appliance in which the thermostat 10 is employed. Secured to the terminal 38 is an L-shaped contact element 41 which extends inwardly into the chamber 22 of the body portion 14 and terminates in a right-angle portion 42 on which a contact button 44 is located. A similar L-shaped contact element 46 is secured to the terminal 40 and extends inwardly of the body portion 14 into the chamber 22, terminating in a right-angle portion 48 on which a contact button 50 is located. As seen in the drawings, the right-angled portions 42 and 48 are located in spaced apart relation, and accordingly, the contact buttons 44 and 50 are disposed in a corresponding spaced-apart relation.

Positioned in the chamber 22 of the body portion 14 and normally located in engaging relation with the contact buttons 44 and 50 of the contact elements 41 and 46 is a circular contact disc 52. The contact disc 52 thus bridges the space between the contact elements 41 and 46 and establishes electrical communication therebetween to complete the circuit through the terminals 38 and 40. It is seen that in normal operation the thermostat 10 will provide for a complete circuit through the heating unit of the appliance in which the thermostat is employed by means of a circuit through the terminal 38, contact element 41, contact disc 52, contact element 46 and terminal 40. Also formed interiorly of the body portion 14 and communicating with the chamber 22 is a recess 54 into which a coil spring 56 extends. The coil spring 56 further engages the surface of the contact disc 52 adjacent thereto and thus normally urges the contact disc 52 into engagement with the contact buttons 44 and 50.

In order to remove the contact disc 52 from engagement with the contact buttons 44 and 50 when a predetermined temperature is reached in the atmosphere surrounding the thermostat 10, a transfer pin generally indicated at 58 is provided. The transfer pin 58 includes an enlarged portion 60, the innermost end of which is slightly spaced from the adjacent surface of the bimetallic actuating disc 28 in the normal or closed position thereof. Formed integrally with the enlarged portion 60 of the transfer pin 58 is a shank portion 62 that is reduced in diameter with respect to the enlarged portion 60 and thus defines an annular shoulder 63 therewith. Located centrally of the contact disc 52 is an opening 65 through which the shank portion 62 of the transfer pin 58 extends. The contact disc 52 is thus disposed on the shoulder 63 of the transfer pin 58 and is responsive to movement of the transfer pin upon flexing movement of the temperature responsive actuating disc 28. It is seen that when the temperature of the atmosphere surrounding the thermostat 10 exceeds a predetermined value, the temperature responsive actuaing disc 28 will flex outwardly in response thereto, thereby moving the transfer pin 58 therewith to lift the contact disc 52 from engagement with the contact buttons 44 and 50. As previously described, movement of the contact disc 52 out of engagement with the contact buttons 44 and 50 will break the circuit between the terminals 38 and 40 and thus will disconnect the heating element of the appliance in which the thermostat 10 is located.

As described, the thermostat 10 is designed to open the circuit between the terminals 38 and 40 at a given temperature. However, the actuating disc 28 is not designed to automatically reset when the temperature surrounding the thermostat is reduced. In order to reset the actuating disc 28 to the normal position thereof, thereby reestablishing electrical communication between the terminals 38 and 40, a manual reset is required. For this purpose a push-button reset member generally indicated at 64 is provided and, as will be described, is operative to return the actuating disc 28 to the closed position for reestablishing electrical communication between the terminals 38 and 40. Since it is essential that the actuating disc 28 be protected from an overload pressure during the resetting thereof, a safety feature is incorporated in the construction of the thermostat 10, as will be described. The reset member 64 includes a reset button 66 to which a shaft 68 is joined. The shaft 68 extends through an opening 70 formed in the neck section 30 of the body portion 14 and is provided with an enlarged head 74 on the innermost end thereof. The head 74 which includes an inner surface 75 extends into the coil spring 56 and is movable therein, while a shoulder 76 defined by the enlarged head 74 and the shaft 68 prevents withdrawal of the reset member 64 in an outer direction. In order to provide for relative movement of the reset member 64 with respect to the transfer pin 58 during initial movement of the reset member, a central opening 78 is provided in the enlarged head 74 and receives the shank 62 of the transfer pin 58 therein. A spring element 80 is further provided between the outer end of the reduced neck portion 30 and the under surface of the reset button 66. It is pointed out that the spring element 80 is not required in the construction as illustrated, but as employed will act to return the reset member 64 to the original position thereof after the reset operation. When the spring element 80 is omitted from the construction, the flexing movement of the actuating disc will move the reset member 64 to the outer position prior to the reset operation.

During a reset operation, the reset member 64 is manually moved inwardly with respect to the body portion 14, the inner end 75 of the enlarged head 74 normally engaging the outer surface of the contact disc 52 and thus forcing the contact disc 52 inwardly together with the transfer pin 58. Since the transfer pin 58 in the open position is located in engaging relation with the actuating disc 28, the actuating disc 28 will be snapped to the normal position thereof as the reset member 64 is pushed inwardly. It is seen that inner movement of the contact disc 52 is limited by the engagement thereof with the contact buttons 44 and 50. Thus the contact buttons 44 and 50 act to prevent the reset member 64 from exerting an overload pressure on the actuating disc 28 during the reset operation and the actuating disc is accordingly prevented from being thrown out of calibration.

In operation of the invention, the thermostat 10 is placed in circuit in an electrical appliance, such as a coffee percolator or the like. In the normal or closed position as shown in FIG. 1, the contact disc 52 bridges the space between the contact elements 41 and 46 and establishes a complete circuit through the terminals 38 and 40, wherein current through the heating coil of the appliance causes the heating chamber of the appliance to be heated in the usual manner. When the temperature of the atmosphere surrounding the thermostat 10 exceeds a predetermined value, the temperature responsive actuating dis 28 flexes outwardly, thereby moving the transfer pin 58 therewith to the position illustrated in FIG. 2. Since the contact disc 52 is engaged by the transfer pin 58, it is shifted therewith to break the circuit between the terminals 38 and 40. It is understood that when the temperature responsive actuating disc 28 is flexed outwardly, it overcomes the resistance of the coil spring 56 and moves the contact disc 52 therewith to the open position thereof. Since the temperature responsive actuating disc 28 will not automatically reset when the temperature surrounding the thermostat decreases below the predetermined value, it can only be reset manually. In order to perform the reset operation, the push button 66 is manually depressed to move the shaft 68 inwardly therewith. Movement of the reset member 64 as shown in FIG. 3, causes the inner surface 75 of the shaft 68 to engage the adjacent outer surface of the contact disc 52. Further movement of the reset member 64 in an inward direction then causes the temperature responsive actuating disc 28 to snap to the normal inwardly bowed position thereof. Since the temperature responsive actuating disc 28 has been calibrated to flex at a predetermined temperature, it is essential that undue pressure be prevented from being impressed thereon, or otherwise the prearranged calibration will be disturbed. By locating the contact buttons 44, 50 of the contact elements 41 and 46 between the contact disc 52 and the actuating disc 28, the contact buttons will act as an inner stop for the contact disc. Thus inward movement of the contact disc 52 and the transfer pin 58 is limited as shown in FIG. 3, and the actuating disc 28 is protected from excessive pressures being exerted thereon during the reset operation.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a temperature responsive device, a base member in which a temperature responsive element is located that is responsive to a predetermined temperature of the surrounding environment for exerting an outer flexing movement, a body portion secured to said base member and having an interior chamber formed therein, contact elements extending into said chamber and being spaced from each other and from said temperature responsive element, a contact member located in said chamber and normally engaging both said contact elements to bridge the space therebetween, thereby establishing electrical communication between said contact elements, said contact member being movable outwardly to an open position in response to the flexing movement of said temperature responsive element to break the electrical circuit between said contact elements, and a reset member extending into said body portion for movement in a reset direction toward said contact member for engagement therewith, said reset member including a shaft portion that extends inwardly through an opening in said body portion and into said chamber, said shaft portion terminating at the lower end thereof in a head that defines a shoulder therewith, said shoulder limiting outer movement of said reset member, the lower surface of said head engaging said contact member so that downward pressure applied to said shaft portion will move said contact member from the open position thereof to the engaging and bridging position with respect to said spaced contact elements, said temperature responsive element being responsive to the return movement of said contact member for return to the original unflexed position thereof.

2. In a temperature responsive device as set forth in claim 1, a transfer member located in said chamber in close proximity to said temperature responsive element and being movable by said temperature responsive element upon outward flexing movement thereof, said head having a central opening formed therein for receiving a portion of the transfer member and thereby positively locating said transfer member with respect to said reset member.

3. In a temperature responsive device as set forth in claim 1, said contact elements being disposed between said temperature responsive element and said contact member and thereby defining a stop for limiting downward movement of said contact member during the resetting operation.

4. In a temperature responsive device as set forth in claim 3, a transfer member including a pin that is located in close adjacent relation to said temperature responsive element and engaging said contact member for transmitting the flexing movement of said temperature responsive element into axial movement of said contact member when the contact member is moved to the open position thereof, said pin having a reduced shaft joined thereto that extends through said contact member for entry into the head of the reset member for positively locating said transfer member with respect to said reset member.

References Cited by the Examiner
UNITED STATES PATENTS

| | | | |
|---|---|---|---|
| 2,230,770 | 2/1941 | Van Almelo | 200—122 |
| 2,714,644 | 8/1955 | Harrison | 200—138 |
| 2,717,936 | 9/1955 | Bolesky | 200—138 |
| 2,824,194 | 2/1958 | Moorhead | 200—138 |

BERNARD A. GILHEANY, *Primary Examiner.*

L. A. WRIGHT, *Assistant Examiner.*